July 2, 1929.   L. J. PURCELL   1,719,560
PARKING INDICATOR
Filed Aug. 8, 1928   2 Sheets-Sheet 1

Inventor
Laurence J. Purcell,
By:- Smith & Michael,
Attorneys.

July 2, 1929.  L. J. PURCELL  1,719,560
PARKING INDICATOR
Filed Aug. 8, 1928  2 Sheets-Sheet 2
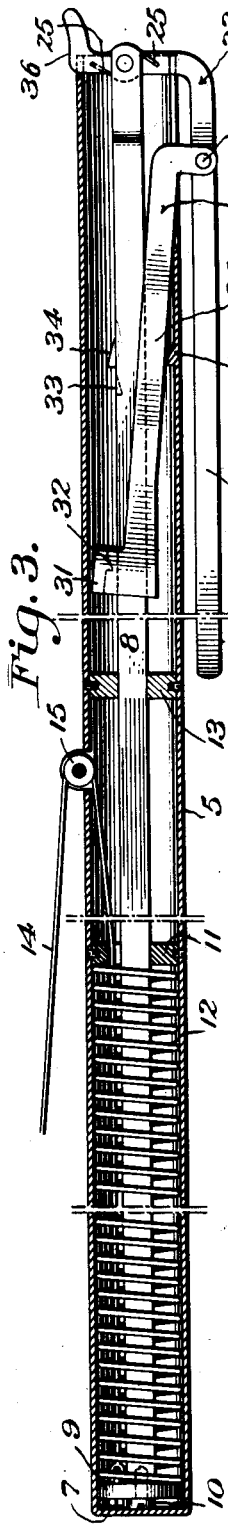
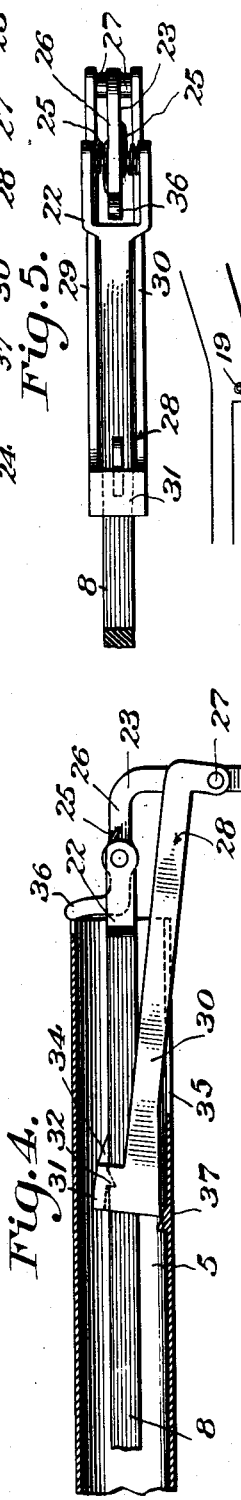
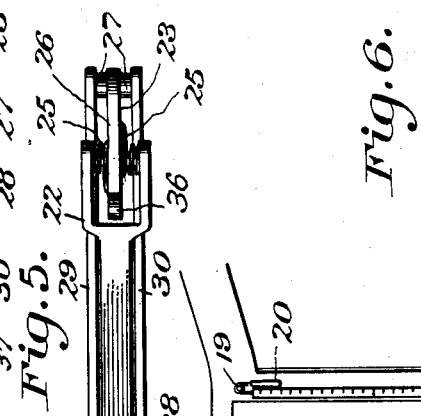
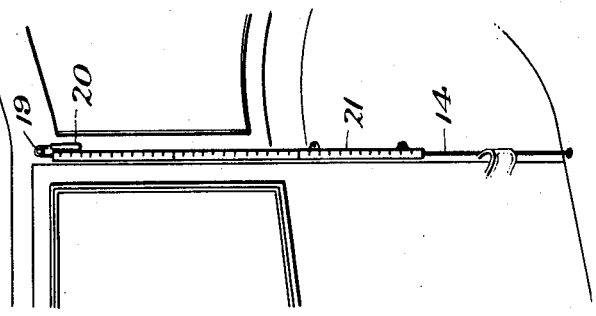
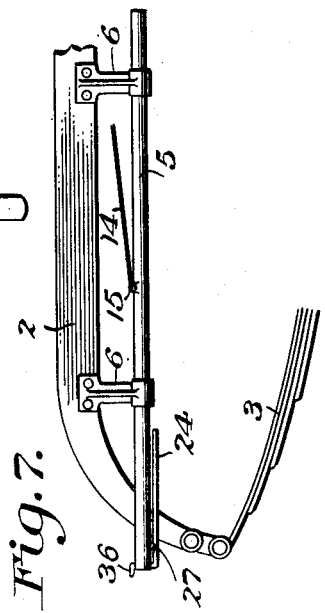
Inventor
*Lawrence J. Purcell,*
By:- *Smith and Michael,*
Attorneys Patented July 2, 1929.

1,719,560

UNITED STATES PATENT OFFICE.

LAURENCE J. PURCELL, OF NEW YORK, N. Y.

PARKING INDICATOR.

Application filed August 8, 1928. Serial No. 298,377.

My invention relates to parking indicators for motor vehicles, and has particular reference to an indicator adapted for attachment to a motor vehicle or the like to indicate to the operator of said vehicle the distance between the vehicle and the adjacent curbing or other objects in proximity to the side of or rear of the vehicle.

An object of my invention is to provide a parking indicator adapted for attachment to a motor vehicle, and including a gauge member which may be projected from the vehicle to contact with the adjacent curbing or other objects to the side of or in rear of the vehicle, to indicate to the operator the distance between the vehicle and the curbing or other adjacent objects, to thus assist the operator in parking the vehicle.

A further object of my invention is to provide a parking indicator including a manually projected, spring retracted, gauge member attached to the motor vehicle, and to associate with this gauge member a scale or indicator positioned near the operator of the vehicle, to indicate to said operator the extent of projection of the gauge member, and thus apprise him of the distance between the adjacent curbing or other objects in proximity to the side of or in rear of the vehicle.
A further object of my invention is to provide a parking indicator including a spring retracted gauge member normally housed in a suitable casing attached to the motor vehicle at the rear thereof, this gauge member being connected to a flexible cable, the free end of which is positioned near the driver's seat of the vehicle, said cable being manually operable to project the gauge member from its casing, the extent of projection of the gauge member from its casing being indicated to the driver, to thus apprise him of the proximity of the adjacent curbing or other objects with which the gauge member is in its projected position has come in contact.
A still further object of my invention is to provide a device of the above mentioned character, which is simple in construction, reliable in operation, cheap and easy to manufacture and install, and highly efficient in the purpose for which designed.

Referring to the accompanying drawings, wherein for the purpose of illustration, I have shown a preferred embodiment of my invention:
Fig. 1 is a side view of a portion of a motor vehicle of the sedan type showing my improved parking indicator attached at the rear thereof;

Fig. 3 is a vertical sectional view through the casing, showing the gauge member in retracted or normal position;

Fig. 4 is a vertical sectional view of a portion of the casing, showing the gauge member in the position which it assumes during its initial movement toward a projected or indicating position;

Fig. 5 is a plan view of a portion of the gauge member, showing the same in the position which it assumes when projected from the casing;

Fig. 6 is a perspective view of a portion of the inner front left corner of a vehicle body, showing the location of the scale or indicator, and the free end of the flexible cable by means of which the gauge member is projected from its casing, and

Fig. 7 is a side elevation of the rear portion of the chassis of a vehicle, showing my improved parking indicator positioned to be projected to the rear of the vehicle.

Figure 1:
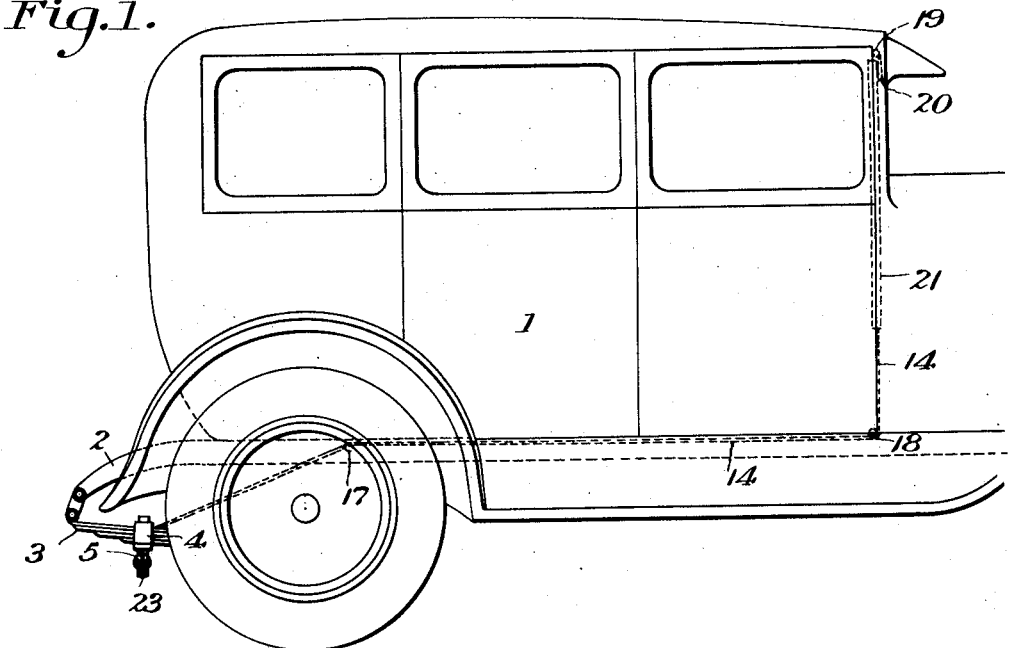
Figure 2:
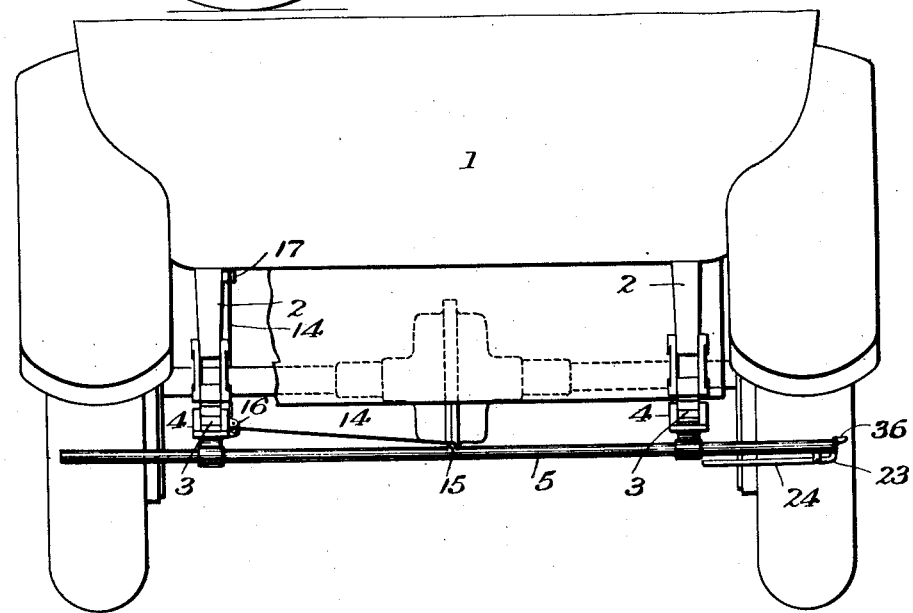
Fig. 2 is a rear view of a portion of the vehicle shown in Fig. 1, showing the means of attaching my improved parking indicator to the chassis of the vehicle.

Referring in detail to the drawings, wherein like reference characters are employed to designate like parts throughout the several views, the numeral 1 designates a portion of a motor vehicle including the longitudinal chassis frame members 2 and the rear spring members 3. Attached to the spring members 3 by suitable clamps 4, is a tubular casing 5, which extends, in the form of my invention shown in Figs. 1 and 2, transversely of the vehicle and below the spring members 3, it being understood that in this form of my improved parking indicator, the same is mounted so that the gauge member can be projected to the right side of the vehicle. In Fig. 7 I have shown my improved device attached in spaced, parallel relation to the rear portion of the right hand chassis frame 2 of the vehicle and adapted to be projected to the rear of the vehicle, this attachment being accomplished by suitable clamps 6, riveted or otherwise secured to the chassis frame 2.

The tubular casing 5 is closed at its inner end, as indicated at 7, and is open at its opposite or outer end, and has mounted thereon a gauge rod or member 8, which extends from end to end of the said casing, as clearly indicated in Fig. 3 of the accompanying drawings. The inner end of the gauge rod or member 8 is provided with a head or disk 9, which is attached to the rod end by a suitable fastening means, such as the screw 10. Within the casing 5, at a point near the middle of the length, is rigidly secured an apertured disk 11 through which the gauge rod or member 8 extends, and between this disk 11 and the head or disk 9 at the inner end of said member 8, is a coiled tension spring 12, which surrounds the gauge rod or member 8 and normally tends to urge this member and its associated parts to be hereinafter described, into the casing, so that the head or disk 9 abuts the inner end of the casing, this being the normal or retracted position of the device. One or more apertured disks 13 are rigidly secured within the casing, the gauge rod or member 8 passing through these disks, said disks acting as guides or bearings to support and guide the gauge rod or member 8 during its movements to and from its normal position.

As a means for projecting the gauge rod or member 8 from the casing 5 against the tension of the spring 12, I provide a flexible chain or cable 14, which is secured to the head or disk 9 and extends inwardly toward the middle of the casing, where it is passed out of the casing and around a sheave or pulley 15. This cable 14 is extended from the pulley 15 toward the left side of the vehicle where it is passed over a sheave or pulley 16 and is then passed toward the front of the vehicle over sheaves or pulleys 17 and 18, then upwardly through the floor-board of the vehicle at the inner left front corner of the vehicle, then over another sheave or pulley 19, and then terminates in a handle member 20. It is obvious from this description that the operator of the vehicle can pull the handle 20 downwardly and that the cable will cause the gauge rod or member 8 to be projected outwardly from the casing 5 against the tension of the spring 12, the amount of such projection being dependent upon the extent of movement of the handle 20 and its associated cable 14. In order to apprise the driver or operator of the extent of the projection of the gauge rod or member 8, I attach a scale or indicator 21 to the inner corner of the body of the vehicle, this scale or indicator being positioned vertically below the pulley 19 and being graduated in feet or inches, it being understood that as the handle 20 is moved downwardly to project the gauge rod or member 8 from its casing 5 as above explained, the position of the handle 20 relative to the graduations on the scale 21, will indicate in feet or inches the extent of projection of the member 8. When the handle is released by the driver or operator, the tension spring 12, acting between the stationary abutment 11 and the head or disk 9 on the inner end of the member 8, will cause the said member 8 to be retracted within its casing 5 to the position shown in Fig. 3, and the handle 20 will assume a "zero" position with relation to the scale 21.

The outer end of the gauge rod or member 8 is forked as indicated at 22, and between this forked end is pivotally mounted a contacting arm 23, this arm being substantially L-shaped and so mounted that its long arm 24 assumes a position parallel to the gauge rod or member 8 when the same is in its normal or retracted position, means being provided for swinging the said arm 23 about the pivotal mounting at the end of the member 8 so as to position the long arm 24 at right angles to the member 8, and for retaining the said arm in such position when the member 8 is projected from its casing. The preferred means for automatically swinging this arm 23 to its proper position with the arm 24 at right angles to the gauge rod or member 8 comprises a pair of springs 25, these springs surrounding the pivot pin between the forked end 22 of the gauge rod or member 8 and being so tensioned and anchored to the forked arms and to the short arm 26 of the L-shaped lever 23 that they normally tend to urge the arm 23 in a counter-clockwise direction about its pivot pin. In order to limit the movement of the arm 23 about its pivotal mounting, I attach to the said lever at a point 27 below the intersection of the short arm 26 and the long arm 24, a double-armed lever 28, comprising spaced, parallel arms 29 and 30 which are positioned at opposite sides of the member 8. The inner ends of the arms 29 and 30 are joined by a bridge member 31, on the lower surface of which is a depending tooth 32 adapted to enter in a notch 33 on the upper surface of the gauge rod or member 8 when the arm 24 is at right angles to the member 8. On the upper surface of the rod 8, at a point immediately behind the bridge member 31, is an upwardly-projecting tooth or projection 34, against which the bridge 31 abuts when the tooth 32 is reposing in the notch or recess 33 as shown in Fig. 4. The lower surface of the casing 5, near the outer end thereof, is provided with an open-ended, elongated slot 35, slightly greater in widh than the distance between the outer face of the arms 29 and 30, and extending axially of the tube, and through which the arms 29 and 30 extend. It is thus obvious from the above description, when taken in connection with the accompanying drawings, particularly Figs. 3, 4 and 5 thereof, that as the gauge rod or member 8 is projected from the casing, the springs 25 will cause the arm 24 to move in a counter-clockwise direction about its pivot, this movement drawing the double-armed lever 28 outwardly until the depending tooth 32 drops into the notch 33 and the bridge 31 abuts the projecting tooth 34. The arm 23, therefore, is retained in the position shown in Fig. 4 during the entire extent of the outward projection of the gauge rod or member 8 until the arm 24 contacts with the curbing or other object in proximity to the vehicle.

In order to return the arm 24 to its normal position, i. e., to a position parallel to the casing 5, I provide the inner end of the short arm 26 of the lever 23 with a short, upstanding arm 36, adapted to strike the upper edge of the casing 5 as the member 8 is retracted within the casing, this contact between the arm 36 and casing 5, causing the entire contacting arm 23 to move in a clockwise direction about its pivotal mounting, it being noted from Figs. 3 and 4 of the accompanying drawings that I have provided a cam member 37 on the bottom of the casing, this cam member 37 being engaged by the inner ends of the arms 29 and 30 and functioning to lift said arms upwardly to disengage the depending tooth 32 from the notch or recess 33, to permit the arm 28 to slide along he gauge rod or member 8.

Referring now to the operation of my improved parking indicator constructed as above described, let it be assumed that the driver or operator of the vehicle has directed his car into the curbing toward a parked position so that the vehicle is parallel or substantially parallel to the curbing. City ordinances and police regulations require that the wheels of a parked vehicle must be relatively close to the adjacent curbing, say four or six inches therefrom, and in order to apprise the driver or operator of the distance between the wheels of the vehicle and the adjacent curbing without the necessity of the operator getting out of the car to inspect the position of the vehicle wheels with relation to the curbing, I have provided the device herein described. Proper parking of a vehicles equipped with my improved parking indicator is a comparatively simple operation, as it is only necessary for the operator of the vehicle to grasp the handle 20 and pull the same downwardly until the arm 24 contacts with the curb, the position of the handle 20 with respect to the scale 21 readily indicating to the operator the extent of projection of the gauge rod or member 8, and consequently the exact distance in feet or inches between the wheels of the vehicle and the adjacent curb. As the handle 20 is moved downwardly, the gauge rod or member 8 is projected from the casing 5 against the tension of the spring 12. The springs 25 move the contacting arm 23 in a counter-clockwise direction about its pivotal mounting and the double-armed lever 28, due to the engagement between the tooth or projection 32 and the notch 33 and the contact between the bridge member 31 and the stop or projection 34, rigidly retains the depending arm 24 in a position at right angles to the gauge rod or member 8. After the operator has been apprised of the distance between the wheels of the vehicle and the adjacent curbing, he releases the handle 20, at which time the spring 12 retracts the gauge rod or member 8 to its inner or normal position and the handle 20 assumes a "zero" position with relation to the scale 21. Near the end of the inward movement of the gauge rod or member 8, the short arm 36 contacts with the upper edge of the casing 5, the lower ends of the levers or arms 29 and 30 contact with the cam or projection 37 to disengage the tooth 32 from the notch 33, and the contacting arm 23 is forced in a clockwise direction about the pivot, thus disposing the arm 24 in a parallel position with the casing 5, as clearly shown in Fig. 3.

The construction and operation of the form of my invention shown in Fig. 7 are identical with that above described, except that the device is so mounted on the vehicle as to be projected to the rear thereof to apprise the driver or operator of the distance between the vehicle and adjacent objects to the rear of the same. This method of mounting my improved parking indicator is especially useful when parking a vehicle in a garage or when backing toward another vehicle in the operation of parking or when endeavoring to get out of a parking space.

It is to be understood that the form of my invention herein shown and described is to be taken as a preferred embodiment of the same, and that various changes may be made in the shape, size, and arrangement of parts without departing from the spirit of my invention or the scope of the subjoined claims.

Having thus described my invention, I claim:

1. A parking indicator comprising a gauge rod attached to a vehicle, means for projecting said gauge rod to contact with the curbing or objects in proximity to the vehicle, and means adjacent the driver's seat for indicating to the operator of the vehicle the extent of such projection.

2. A parking indicator comprising a casing attached to a vehicle, a gauge rod slidable within said casing, means for projecting said gauge rod from its casing to contact with the curbing or objects in proximity to the vehicle, and means adjacent the driver's seat for indicating to the operator of the vehicle the extent of such projection.

3. A parking indicator comprising a casing attached to a vehicle, a gauge rod slidable within said casing, a spring for normally retaining said rod within the casing, means for projecting said gauge rod from the casing against the tension of the spring, and means for indicating to the operator of the vehicle the extent of such projection.

4. A parking indicator comprising a casing attached to a vehicle, a gauge rod slidable within the casing, a head at the inner end of said gauge rod, a stationary abutment within the casing, a spring positioned between the head and stationary abutment for normally retaining said gauge rod within the casing, means for projecting said gauge rod from the casing against the tension of the spring, and means for indicating to the operator of the vehicle the extent of such projection.

5. A parking indicator comprising a casing attached to a vehicle, a gauge rod slidable within the casing, a head secured to the inner end of the gauge rod, an apertured abutment secured within the casing and through which the gauge rod passes, a coiled tension spring surrounding the gauge rod and extending between the head and apertured abutment for normally retaining said gauge rod within the casing, means for projecting said gauge rod from the casing against the tension of the spring, and means for indicating to the operator of the vehicle the extent of such projection.

6. A parking indicator comprising a gauge rod attached to a vehicle, a flexible cable attached to the gauge rod for projecting said gauge rod to contact with the curbing or objects in proximity to the vehicle, an operating handle attached to said cable, and a scale cooperating with the said operating handle to indicate to the operator of the vehicle the extent of projection of the gauge rod.

7. A parking indicator comprising a casing attached to a vehicle, a gauge rod slidable within said casing, a flexible cable attached to the gauge rod for projecting said gauge rod from its casing to contact with the curbing or objects in proximity to the vehicle, an operating handle attached to said cable, and a scale cooperating with said operating handle to indicate to the operator of the vehicle the extent of projection of the gauge rod from the casing.

8. A parking indicator comprising a casing attached to a vehicle, a gauge rod slidable within said casing, a spring for normally retaining said rod within the casing, a flexible cable attached to the gauge rod for projecting said gauge rod from the casing against the tension of the spring, an operating handle attached to said cable, and a scale cooperating with the said operating handle to indicate to the operator of the vehicle the extent of projection of the gauge rod from the casing.

9. A parking indicator comprising a casing attached to a vehicle, a gauge rod slidable within the casing, a head at the inner end of said gauge rod, a stationary abutment within the casing, a spring positioned between the head and stationary abutment for normally retaining said gauge rod within the casing, a flexible cable attached to the head and extending through the casing for projecting said gauge rod to contact with the curbing or objects in proximity to the vehicle, an operating handle attached to said cable, and a scale cooperating with said operating handle to indicate to the operator of the vehicle the extent of projection of the gauge rod.

10. A parking indicator comprising a gauge rod attached to a vehicle, a flexible cable attached to the gauge rod for projecting said gauge rod to contact with the curbing or other objects in proximity to the vehicle, said cable extending from the gauge rod and upwardly along the inner corner of the vehicle body, an operating handle attached to the free end of the said cable, and a vertically extending scale positioned adjacent the flexible cable at the inner corner of the vehicle body to cooperate with the said operating handle to indicate to the operator of the vehicle the extent of projecion of the gauge rod.

11. A parking indicator comprising a casing attached to a vehicle at the rear thereof, a gauge rod slidable within said casing, a flexible cable connected to said gauge rod for projecting said gauge rod from the casing, said cable extending from the gauge rod toward the front of the vehicle, through the floor thereof, upwardly along an inner corner of the vehicle, and over a pulley at the upper inner corner of the vehicle, an operating handle connected to the free end of the cable, and a scale positioned adjacent the flexible cable at the inner corner of the vehicle body below the said pulley and adapted to cooperate with the said operating handle to indicate to the operator of the vehicle the extent of projection of the gauge rod from the casing.

12. A parking indicator comprising a rod attached to a vehicle, a pivoted lever mounted on the outer end of said rod and normally occupying a position parallel to the said rod, means to project said rod and to move said pivoted lever to a position at right angles to said rod, and means for indicating to the operator of the vehicle the extent of projection of said rod.

13. A parking indicator comprising a casing a casing attached to a vehicle, a rod slidable within said casing, a pivoted lever mounted at the outer end of said rod and normally occupying a position parallel to the said rod, means to project said rod from said casing, a lever connected to said rod and to said lever for moving said lever to a position at right angles to the rod when said rod is projected from its casing, and means for indicating to the operator of the vehicle the extent of projection of said rod from its casing.

14. A parking indicator comprising a casing attached to a vehicle, a rod slidable within said casing, a pivoted lever mounted at the outer end of said rod, a spring for normally retaining said rod within the casing and for retaining said pivoted lever in a position parallel with said rod, means to project said rod from its casing against the tension of the said spring and to move said lever to a position at right angles to the rod when said rod is projected from its casing, and means for indicating to the operator the extent of projection of said rod from its casing.

15. A parking indicator comprising a casing attached to a vehicle, a rod slidable within said casing, a pivoted lever mounted at the outer end of said rod and normally occupying a position parallel to the said rod, means to project said rod from said casing, a lever pivotally connected to said pivoted lever and slidable along the said rod, latching means on said rod and said last mentioned lever for moving the first mentioned lever to a position at right angles to the rod when said rod is projected from its casing, and means for indicating to the operator of the vehicle the extent of projection of said rod from its casing.

16. A parking indicator comprising a casing attached to a vehicle, a rod slidable within said casing, a pivoted lever mounted at the outer end of said rod and normally occupying a position parallel to the said rod, means to project said rod from said casing, means for moving said lever to a position at right angles to the rod and for retaining said lever in this position when the rod is projected from its casing, means to indicate to the operator the extent of projection of the rod, and means to move said lever to its normal position parallel to the rod when said rod is retracted within its casing.

17. A parking indicator comprising a casing attached to a vehicle, a spring retracted, manually projected slidable rod mounted within said casing, a pivoted lever mounted at the outer end of said rod and occupying a position parallel thereto when said rod is in its retracted position, means for moving said lever to a position at right angles to the rod when said rod is projected from its casing, latching means for retaining said lever in this position during the projection of said rod, means to indicate to the operator of the vehicle the extent of such projection, and means for releasing the latching means and moving said lever to its normal position parallel to the rod when the said rod is retracted within its casing.

18. A parking indicator comprising a casing attached to a vehicle, a spring retracted, manually projected slidable rod mounted within said casing, a pivoted lever mounted at the outer end of said rod and occupying a position parallel thereto when said rod is in its retracted position, a spring associated with the first mentioned lever to move the same to a position at right angles to the rod when said rod is projected from its casing, latching means for retaining said lever in a position at right angles to the rod when said rod is projected from its casing, an abutment on said lever adapted to move the lever to a position parallel to the rod when said rod is retracted within said casing, and means to indicate to the operator of the vehicle the relative position of the rod within its casing.

19. A parking indicator comprising a casing attached to a vehicle, a spring retracted, manually projected slidable rod mounted within said casing, a pivoted lever mounted at the outer end of said rod and normally occupying a position parallel thereto when said rod is in its retracted position, a second lever pivotally connected to the said pivoted lever and slidable along the rod, a spring associated with the first lever to move the same to a position at right angles to the rod when said rod is projected from its casing, latching means on the rod and on the second lever for retaining the first lever at right angles to the rod when said rod is projected from its casing, an abutment on the first lever adapted to move the lever to a position parallel to the rod when said rod is retracted within said casing, and means to disengage the latching means to permit said first lever to assume its normal position parallel to the rod.

20. A parking indicator comprising a casing attached to a vehicle, a spring retracted, manually projected, slidable rod mounted within said casing, a pivoted lever mounted at the outer end of said rod and normally occupying a position parallel thereto when said rod is in its retracted position, a second lever pivotally connected to the said pivoted lever and slidable along the rod, a spring associated with the first lever to move the same to a position at right angles to the rod when said rod is projected from the casing, latching means on the rod and on the second lever for retaining the first lever at right angles to the rod when said rod is projected from its casing, an abutment within the casing for releasing said latching means during the inward movement of the rod, and an abutment on the first lever which engages the casing during the inward movement of the rod to move the lever to a position parallel to the rod when said lever is retracted within said casing.

In testimony whereof I hereunto affix my signature.

LAURENCE J. PURCELL.